United States Patent
Masuda (10) Patent No.: US 8,660,732 B2
(45) Date of Patent: Feb. 25, 2014

(54) VEHICLE WITH EXTERNAL CHARGING

(75) Inventor: Tomokazu Masuda, Kasugai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/579,489

(22) PCT Filed: Mar. 1, 2011

(86) PCT No.: PCT/IB2011/000418
§ 371 (c)(1),
(2), (4) Date: Aug. 16, 2012

(87) PCT Pub. No.: WO2011/107851
PCT Pub. Date: Sep. 9, 2011

(65) Prior Publication Data
US 2012/0330489 A1    Dec. 27, 2012

(30) Foreign Application Priority Data
Mar. 2, 2010    (JP) ................................ 2010-045568

(51) Int. Cl.
*B60L 9/00*    (2006.01)
(52) U.S. Cl.
USPC .......................................................... 701/22
(58) Field of Classification Search
USPC .............................. 701/22; 180/65.1; 318/139
See application file for complete search history.

(56) References Cited

U.S. PATENT DOCUMENTS

| | | | | |
|---|---|---|---|---|
| 5,596,258 | A * | 1/1997 | Kimura et al. ................ | 320/163 |
| 7,049,789 | B2 * | 5/2006 | Taniguchi et al. ............ | 320/104 |
| 2009/0242291 | A1 * | 10/2009 | Sagawa et al. ........... | 180/65.265 |
| 2009/0301801 | A1 * | 12/2009 | Fujitake ..................... | 180/65.29 |
| 2010/0007306 | A1 * | 1/2010 | Fukui et al. .................... | 320/107 |

FOREIGN PATENT DOCUMENTS

| | | |
|---|---|---|
| DE | 10 2006 028 119 A1 | 12/2007 |
| DE | 10 2007 005 359 A1 | 8/2008 |
| EP | 2 105 343 A2 | 9/2009 |
| EP | 2 113 434 A1 | 11/2009 |
| JP | A-7-192826 | 7/1995 |
| JP | A-7-274309 | 10/1995 |
| JP | A-9-322313 | 12/1997 |
| JP | A-2001-57295 | 2/2001 |
| JP | A-2009-62027 | 3/2009 |

(Continued)

OTHER PUBLICATIONS

Jul. 4, 2011 International Search Report issued in International Application No. PCT/IB2011/000418.

(Continued)

*Primary Examiner* — Mary Cheung
*Assistant Examiner* — Anne Mazzara
(74) *Attorney, Agent, or Firm* — Oliff PLC (57) ABSTRACT

A vehicle can be charged by receiving electric power from an external power supply apparatus (600) via a charging cable (450) and includes an inlet (220), a lid (250) for protecting the inlet (220), and an electricity storage device (110). The inlet (220) includes a C terminal (227) for detecting connection to the power supply apparatus (600) and a G terminal that is connected to the body earth of the vehicle (100). The lid (250) is configured to electrically connect between the C terminal (227) and the G terminal (223) when the lid (250) is closed. The vehicle (100) further includes a PLG-ECU (350) that detects whether the lid (250) is open or closed, based on the voltage of the C terminal (227).

12 Claims, 9 Drawing Sheets

(56) References Cited

FOREIGN PATENT DOCUMENTS

| | | |
|---|---|---|
| JP | A-2009-65728 | 3/2009 |
| JP | A-2009-77557 | 4/2009 |
| JP | A-2009-95157 | 4/2009 |
| JP | A-2009-136110 | 6/2009 |
| JP | A-2009-227218 | 10/2009 |
| JP | A-2010-22163 | 1/2010 |

OTHER PUBLICATIONS

Jul. 4, 2011 Written Opinion issued in International Application No. PCT/IB2011/000418.

Jan. 26, 2012 Office Action issued in Japanese Patent Application No. 2010-045568 (with partial translation).

* cited by examiner

| VC | CONNECTION STATE | INDICATION | WHETHER OR NOT VEHICLE CAN RUN | POWER SOURCE / GND |
|---|---|---|---|---|
| $\alpha 2 < VC$ | LID IS OPEN AND POWER SUPPLY APPARATUS IS NOT CONNECTED / LINE IS BROKEN | ⚠ | YES | — |
| $\alpha 1 < VC \leq \alpha 2$ | LID IS CLOSED | — | YES | VEHICLE SIDE |
| $VC \leq \alpha 1$ | POWER SUPPLY APPARATUS IS CONNECTED | [CABLE] | NO | POWER SUPPLY APPARATUS SIDE |

VEHICLE WITH EXTERNAL CHARGING

BACKGROUND OF THE INVENTION

1. Field of the Invention

The invention relates to a vehicle and in particular to control of a vehicle that can be charged by electric power supplied from an external power source external to the vehicle.

2. Description of the Related Art

In recent years, focus is put on a vehicle, regarded as an environmentally conscious vehicle, that is equipped with an electricity storage device, such as a secondary battery or a capacitor, and runs using the driving force generated by the electric power stored in the electricity storage device. Examples of such a vehicle include pure electric vehicles, hybrid vehicles, and fuel cell vehicles. Technologies for charging the electricity storage devices installed in these vehicles with the use of the commercial power source that is generated with high efficiency are proposed.

Even in the case of hybrid vehicles, there are vehicles, in which the electricity storage device mounted on the vehicle can be charged (hereinafter also referred to merely as the "external charging operation") by a power source external to the vehicle (hereinafter also referred to merely as the "external power source") as in the case of the pure electric vehicles. For example, what is called the "plug-in hybrid vehicle" is known, in which the electricity storage device can be charged by the domestic electric power source by connecting a charging port provided in the vehicle to the outlet, or power point, in a home via a charging cable. It can be expected that the fuel consumption/efficiency of a hybrid vehicle be improved.

Japanese Patent Application Publication No. 2009-227218 (JP-A-2009-227218) describes a configuration of a vehicle that can be driven by a plurality of sources of energy as in the case of hybrid vehicles and that has a plurality of energy supply ports, such as a fuel inlet port and a charging port, in which control is performed so that, when the lid of one energy supply port is opened, the lid of another energy supply port is prevented from being opened. According to JP-A-2009-227218, it is possible to prevent the occurrence of a situation, in which a charging operation that can produce sparks is performed simultaneously with a refueling operation for refueling highly volatile fuel, and it is also possible to prevent the occurrence of a situation, in which charging is performed through a plurality of charging ports simultaneously. Thus, it is possible to perform the operation for supplying the energy safely and smoothly in the vehicle that has a plurality of energy supply ports.

In a vehicle that has a plurality of energy supply ports, there is a case where, when charging from an external energy source is performed through one charging port, the high voltage applied in this charging operation is applied to the connection terminals of another charging port. In general, there is a case where a protection portion for protecting a charging port, such as an openable door, is provided for the charging port. When the protection portion is left open with the high voltage applied to the connection terminals of the charging port, water and/or foreign objects can enter the terminal portion due to wind and rain, for example, which can cause a leakage of electricity and/or a ground fault. This can lead to the occurrence of failure of the equipment and/or can affect the surrounding.

When a configuration as described in JP-A-2009-227218 is employed, in which a detector for checking the open/close state of each of the openable doors of the charging port(s) and the fuel inlet port, and a lock mechanism for, when one openable door is open, preventing another openable door from being opened, are provided, such a configuration requires a lot of additional equipment, which results in a complex system.

SUMMARY OF THE INVENTION

The invention provides a vehicle that can be charged by electric power supplied from a power source external to the vehicle and that detects whether a protection portion for protecting a charging port is open or closed, without a complex system.

A vehicle according to an aspect of the invention can be charged by receiving electric power from an external power supply apparatus via a charging cable and includes a first inlet, a protection portion, and an electricity storage device. A connector of the charging cable is connected to the first inlet. The protection portion protects the first inlet and can be opened and closed. The electricity storage device is electrically connected to the first inlet and is capable of being charged by the electric power supplied from the power supply apparatus. The first inlet includes a power terminal for receiving electric power from the power supply apparatus, and a first terminal and a second terminal that are separate from the power terminal. The vehicle further includes a controller configured to determine whether the protection portion is open or closed, based on a state of connection between the first terminal and the second terminal.

In the above aspect, a configuration may be employed, in which the first terminal is a terminal that receives a signal for detecting connection of the vehicle to the power supply apparatus via the charging cable; the second terminal is connected to the body earth of the vehicle; and the protection portion includes a connecting portion configured to electrically connect between the first terminal and the second terminal when the protection portion is closed.

In the above aspect, a configuration may be employed, in which, when the protection portion is closed, the protection portion connects between the first terminal and the second terminal via a connecting portion resistor included in the connecting portion.

In the above aspect, a configuration may be employed, in which the controller includes a voltage connection portion that supplies a voltage higher than a voltage of the body earth to the first terminal via a pull-up resistor, and a voltage detecting section that detects a voltage of the first terminal; when the detected voltage detected by the voltage detecting section is lower than a first voltage, the controller determines that the vehicle is connected to the power supply apparatus; when the detected voltage is higher than the first voltage and is lower than a second voltage that is higher than the first voltage, the controller determines that the protection portion is closed; and, when the detected voltage is higher than the second voltage, the controller determines that the protection portion is open and the vehicle is not connected to the power supply apparatus.

The second voltage may be lower than the voltage of the voltage connection portion and higher than a voltage that is determined by the voltage of the voltage connection portion, a resistance value of the connecting portion resistor, and a resistance value of the pull-up resistor when the voltage connection portion is grounded via the connecting portion resistor and the pull-up resistor.

In the above aspect, the vehicle may further include a switching device that is placed in a power line connecting between the power terminal and the electricity storage device and is configured to be brought into conduction when the switching device is closed, and brought out of conduction when the switching device is opened, so that the switching device is capable of switching between supply and cutoff of electric power supplied from the power supply apparatus, wherein the controller closes the switching device when the electricity storage device is charged.

In the above aspect, a configuration may be employed, in which the charging cable includes a power cable that transmits electric power for charging the electricity storage device, a power source line that transmits a first power source voltage for control from the power supply apparatus, and a ground line that is grounded in the power supply apparatus; the first inlet further includes a third terminal and a fourth terminal, to which the power source line and the ground line are connected, respectively, when the charging cable is connected to the first inlet, and a fifth terminal that is connected to a second power source voltage for control in the vehicle; the switching device is closed when the third terminal is connected to the power source voltage and the fourth terminal is grounded; and the protection portion is configured to electrically connect between the third terminal and the fifth terminal and electrically connect between the second terminal and the fourth terminal when the protection portion is closed.

In the above aspect, a configuration may be employed, in which the charging cable includes a power cable that transmits electric power for charging the electricity storage device, a power source line that transmits a first power source voltage for control from the power supply apparatus, and a ground line that is grounded in the power supply apparatus; the first inlet further includes a third terminal and a fourth terminal, to which the power source line and the ground line are connected, respectively, when the charging cable is connected to the first inlet; the switching device is closed when the third terminal is connected to the power source voltage and the fourth terminal is grounded; the vehicle further includes a first line and a second line, the first line connecting between the third terminal and the controller, the second line connecting between the fourth terminal and the controller; the controller includes a power source node, a first switch that electrically connects between the first line and the power source node when the first switch is activated, and a second switch that electrically connects between the second line and the body earth when the second switch is activated; and the controller activates the first switch and the second switch when it is detected that the protection portion is closed.

In the above aspect, a configuration may be employed, in which, when it is detected that the protection portion is opened, the controller deactivates at least one of the first switch and the second switch after an electric current flowing through the switching device falls below a threshold value.

In the above aspect, a configuration may be employed, in which the power supply apparatus supplies direct-current (DC) power to the vehicle; the vehicle further includes a second inlet for receiving alternating-current (AC) power from an external power source, and a charging device, connected between the second inlet and the switching device, for converting the AC power, supplied from the external power source, to DC power to charge the electricity storage device; and the electricity storage device is charged by one of the DC power supplied from the power supply apparatus and the DC power supplied from the charging device.

In the above aspect, the controller may close the switching device when the vehicle is connected to the power supply apparatus and the electricity storage device is charged by the electric power supplied from the power supply apparatus or when the protection portion is closed and the electricity storage device is charged by the electric power supplied from the external power source.

According to the invention, in a vehicle that can be charged by electric power supplied from a power source external to the vehicle, it is possible to detect whether a protection portion for protecting a charging port is open or closed, without a complex system.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the invention will be described in detail below with reference to drawings. Note that the same or corresponding portions in the drawings are designated by the same reference numeral and the description thereof is not repeated.

First Embodiment

Figure 1:
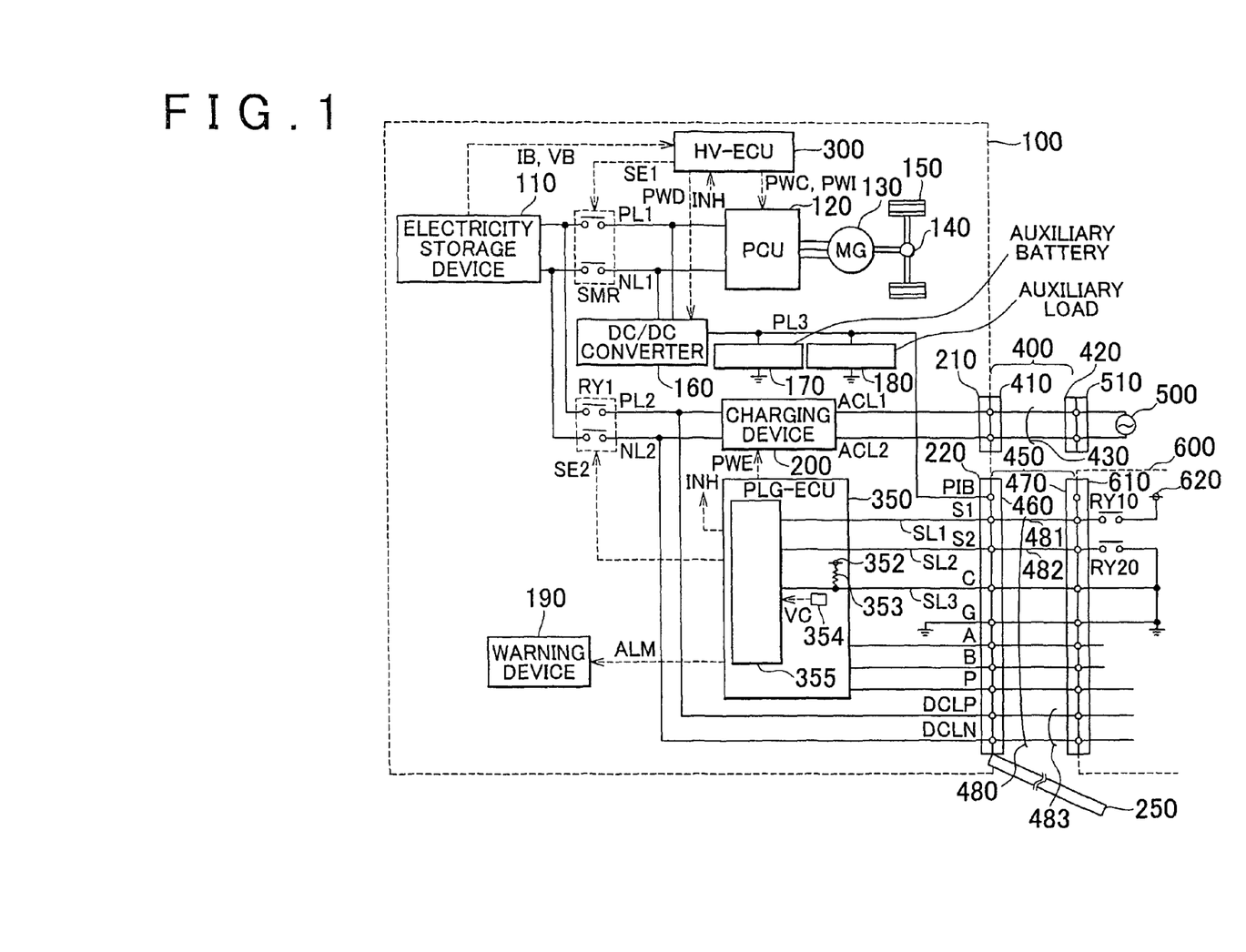
FIG. 1 is an overall block diagram of a vehicle according to a first embodiment.

FIG. 1 is an overall block diagram of a vehicle 100 according to a first embodiment.

Referring to FIG. 1, the vehicle 100 includes an electricity storage device 110, a system main relay SMR, a power control unit (PCU) 120, which functions as a driver device, a motor generator 130, a power transmitting gear 140, driving wheels 150, and a hybrid-vehicle electronic control unit (HV-ECU) 300.

The electricity storage device 110 is an electric power storage unit that is configured to be able to be charged and discharged. The electricity storage device 110 includes a secondary battery, such as a lithium-ion battery, a nickel-hydrogen battery, or a lead-acid battery, or includes an electricity storage element, such as an electric double layer capacitor.

The electricity storage device 110 is connected to the PCU 120 via a power line PL1 and a grounding conductor NL1.

The electricity storage device 110 supplies electric power to produce the driving power of the vehicle 100 to the PCU 120. The electricity storage device 110 stores the electric power generated by the motor generator 130. The output of the electricity storage device 110 is about 200 V, for example.

Relays included in the system main relay SMR are placed in the power line PL1 and the grounding conductor NL1, respectively, that connect between the electricity storage device 110 and the PCU 120. The system main relay SMR is controlled by a control signal SE1 from the HV-ECU 300 and switches between supply and cutoff of electric power between the electricity storage device 110 and the PCU 120.

Although not shown in the drawings, the PCU 120 includes a converter that boosts the power supply voltage supplied from the electricity storage device 110 and an inverter that converts the direct-current (DC) power, boosted by the converter, to an alternating-current (AC) power used to drive the motor generator 130.

These converter and inverter are controlled by control signals PWC and PWI, respectively, supplied from the HV-ECU 300.

The motor generator 130 is an AC rotary electric machine, which is, for example, a permanent magnet-type synchronous electric motor provided with a rotor, in which permanent magnets are embedded.

The torque output from the motor generator 130 is transmitted to the driving wheels 150 via the power transmitting gear 140 including a speed reducer and a power distributing mechanism, thereby driving the vehicle 100. The motor generator 130 can generate electricity with the use of the rotating force of the driving wheels 150 during regenerative braking of the vehicle 100. The generated electric power is converted to the charging power for charging the electricity storage device 110 by the PCU 120.

Note that, although FIG. 1 shows a configuration, in which a single motor generator is provided, the number of motor generators is not limited to this and a plurality of motor generators may be provided.

In a hybrid vehicle equipped with an engine (not shown) in addition to the motor generator 130, the required vehicle driving power is generated by cooperatively operating the engine and the motor generator 130. In this case, it is also possible to charge the electricity storage device 110 with the use of the electric power generated using the rotation of the engine.

In summary, the vehicle 100 according to the first embodiment is a vehicle equipped with an electric motor for generating vehicle driving power, examples of which include a hybrid vehicle that generates the vehicle driving power with the use of the engine and the electric motor, and a pure electric vehicle and a fuel cell vehicle, which are equipped with no engine.

Although not shown in FIG. 1, the HV-ECU 300 includes a central processing unit (CPU), a memory, and an input/output buffer, receives signals from various sensors, outputs control signals to various devices, and controls the vehicle 100 and the various devices. Note that the means for performing these control operations is not limited to processing by software but may be processing using a dedicated hardware device (electronic circuitry).

The HV-ECU 300 generates and outputs control signals for controlling the PCU 120, the system main relay SMR, etc. In addition, the HV-ECU 300 receives a voltage VB and an electric current IB of the electricity storage device 110 that are detected by the sensors (not shown) included in the electricity storage device 110 and calculates the state of charge (SOC) of the electricity storage device 110.

Note that although FIG. 1 shows a configuration, in which the HV-ECU 300 is a single control device, the HV-ECU 300 may be configured to include separate controllers corresponding to functions or devices to be controlled, such as a controller for the PCU 120 and a controller for the electricity storage device 110, for example.

The vehicle 100 includes, as the components of the low voltage system (auxiliaries), a DC/DC converter 160, an auxiliary battery 170, and an auxiliary load 180.

The DC/DC converter 160 is connected to the power line PL1 and the grounding conductor NL1 and steps down the DC voltage supplied from the electricity storage device 110 based on a control signal PWD from the HV-ECU 300. The DC/DC converter 160 supplies electric power to the low voltage system of the entire vehicle, such as the auxiliary battery 170, the auxiliary load 180, and the HV-ECU 300, via a power line PL3.

The auxiliary battery 170 typically includes a lead-acid battery. The output voltage of the auxiliary battery 170 is lower than the output voltage of the electricity storage device 110, that is, about 12 V, for example. The auxiliary load 180 includes lumps, wipers, heaters, and audio equipment, for example.

The vehicle 100 includes, as the components for charging the electricity storage device 110 by electric power supplied from the outside of the vehicle, inlets 210 and 220, a charging device 200, a charging relay RY1, and a plug ECU (PLG-ECU) 350.

In the first embodiment, the vehicle 100 has two charging systems that make it possible to charge the electricity storage device 110 with the use of the electric power supplied from an external power source 500 that supplies AC power and with the use of the electric power supplied from a power supply apparatus 600 that supplies DC power. Note that the charging system is not limited to these two systems; that is, the vehicle 100 may have three or more charging systems or may have a single charging system.

The inlet 210 is provided on a body of the vehicle 100 to receive the AC power from the external power source 500. A charging connector 410 of a charging cable 400 is connected to the inlet 210. When a plug 420 of the charging cable 400 is connected to a receptacle, or point, 510 of the external power source 500, such as the commercial power source, the AC power from the external power source 500 is transmitted to the vehicle 100 via a wire portion 430 of the charging cable 400.

The charging device 200 is connected to the inlet 210 via power lines ACL1 and ACL2. The charging device 200 is also connected to the electricity storage device 110 by a power line PL2 and a grounding conductor NL2 via the charging relay RY1.

The charging device 200 is controlled by a control signal PWE from the PLG-ECU 350 and converts the AC power supplied through the inlet 210 to the electric power for charging the electricity storage device 110.

The charging relay RY1 is placed in the power line PL2 and the grounding conductor NL2. The charging relay RY1 is controlled by a control signal SE2 from the PLG-ECU 350 and switches between supply and cutoff of electric power between the electricity storage device 110 and the charging device 200.

Similarly to the inlet 210, the inlet 220 is provided on the body of the vehicle 100 to receive the DC power from the power supply apparatus 600. A receiving-side connector 460 of the charging cable 450 is connected to the inlet 220. When a supply-side connector 470 of the charging cable 450 is connected to a power supply connection portion 610 of the power supply apparatus 600, the DC power from the power supply apparatus 600 is transmitted to the vehicle 100 via a wire portion 480 of the charging cable 450. The inlet 220 is provided with an openable door (hereinafter also referred to as the "lid") 250, which functions as a protection portion for protecting the inlet 220 when charging is not performed. The form of the protection portion may be a cover or a cap, instead of the openable door. Although not shown, it is preferable that the inlet 210 be also provided with a protection portion.

Figure 2:
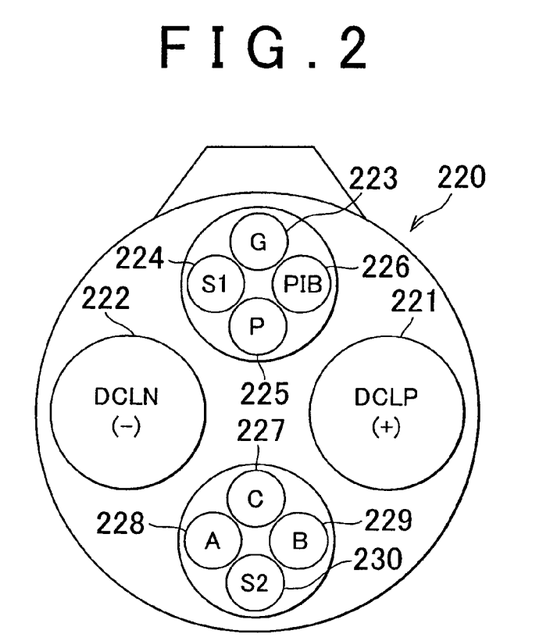
FIG. 2 is a diagram for explaining an arrangement of terminals of an inlet in the first embodiment.

The inlet 220 has a plurality of terminals for receiving the DC power from the power supply apparatus 600 and for sending and receiving control signal(s). The inlet 220 is, for example, an inlet, to which a charging connector conforming to JEVS G105 (Connector used in Eco-station Quick Charge System for Electric Vehicle) of Japanese Electric Vehicle Association Standard (JEVS) and the inlet 220 has a terminal arrangement as shown in FIG. 2. Although the first embodiment is described taking as an example the case where the inlet 220 has a terminal arrangement conforming to the JEVS, the terminal arrangement of the inlet 220 is not limited to that conforming to the JEVS. Specifically, the inlet 220 may have another terminal arrangement as long as it is possible to send and receive similar signals to and from the power supply apparatus 600.

Referring to FIGS. 1 and 2, the inlet 220 includes a positive side DCLP terminal 221 and a negative side DCLN terminal 222 for receiving the high-voltage DC power (about 200 V, for example) from the power supply apparatus 600 for charging the electricity storage device 110. The DCLP terminal 221 and the DCLN terminal 222 are connected to the power line PL2 and the grounding conductor NL2. Thus, the DC power supplied from the power supply apparatus 600 through the power cable 483 included in the charging cable 450 is transmitted to the electricity storage device 110 via the charging relay RY1.

The inlet 220 further includes a G terminal 223, an S1 terminal 224, a P terminal 225, a C terminal 227, an A terminal 228, a B terminal 229, and an S2 terminal 230, which are terminals used to send and receive the control signals to and from the PLG-ECU 350. Each terminal, except the G terminal 223, is connected to the PLG-ECU 350 by a control line.

The S1 terminal 224 and the S2 terminal 230 are terminals for receiving control signals indicative of start and stop of charging, respectively, that are supplied from the power supply apparatus 600.

The S1 terminal 224 is connected to a power source node 620 in the power supply apparatus 600 via a power source line 481 of the charging cable 450 and the relay RY10 in the power supply apparatus 600. The power source voltage of the power source node 620 is about 12 V, for example. When the relay RY10 in the power supply apparatus 600 is closed, the power source voltage of the power source node 620 is supplied to the vehicle 100. The S2 terminal 230 is connected to the ground in the power supply apparatus 600 via a ground line 482 of the charging cable 450 and a relay RY20 in the power supply apparatus 600. When the relay RY20 in the power supply apparatus 600 is closed, the S2 terminal 230 is connected to the ground.

The S1 terminal 224 and the S2 terminal 230 are connected to a control section 355, included in the PLG-ECU 350, via control lines SL1 and SL2. The control section 355 closes the charging relay RY1 when the relays RY10 and RY20 in the power supply apparatus 600 are closed and therefore, the power source voltage is supplied to the S1 terminal 224 and the S2 terminal 230 is connected to the ground. In this way, charging of the electricity storage device 110 with the use of the DC power from the power supply apparatus 600 is started.

When any one of the relays RY10 and RY20 is opened, the control section 355 opens the charging relay RY1 to stop charging.

The C terminal 227 is a terminal for receiving a connection check signal for checking whether the vehicle 100 and the power supply apparatus 600 are connected via the charging cable 450. The C terminal 227 is connected to the ground in the power supply apparatus 600 via the charging cable 450. The C terminal 227 is connected to the control section 355 via the control line SL3. In the PLG-ECU 350, the control line SL3 is connected to a power source node 352 via a pull-up resistor 353. Thus, when the vehicle 100 and the power supply apparatus 600 are connected to each other via the charging cable 450, the control line SL3 is grounded and the voltage thereof becomes substantially zero. On the other hand, when the vehicle 100 and the power supply apparatus 600 are not connected to each other via the charging cable 450, a voltage determined by the power source voltage of the power source node 352 and the resistance value of the pull-up resistor 353 occurs in the control line SL3. Thus, it is possible to check the connection between the vehicle 100 and the power supply apparatus 600 by detecting the voltage of the control line SL3.

The G terminal 223 is a ground terminal, which is connected to a body earth of the vehicle 100. The G terminal 223 is also connected to the ground in the power supply apparatus 600 via the charging cable 450.

The A terminal 228 and the B terminal 229 are terminals for sending and receiving communication signals exchanged between the vehicle 100 and the power supply apparatus 600.

The P terminal 225 is, a terminal for sending, from the vehicle 100 to the power supply apparatus 600, a control signal indicative of whether charging is allowed or inhibited. When the vehicle 100 allows charging, the PLG-ECU 350 sets the control signal to be sent to the P terminal to ON, for example. In response to this, relays and converters (not shown) of the power supply apparatus 600 are controlled, so that DC power is supplied to the vehicle 100. On the other hand, when the electricity storage device 110 is in a fully charged state or when charging is inhibited because of failure of the equipment on the vehicle 100 side, for example, the PLG-ECU 350 sets the control signal to be sent to the P terminal to OFF to stop power supply from the power supply apparatus 600.

The inlet 220 further includes a PIB terminal 226. Although this terminal is a vacant terminal in JEVS, in the first embodiment, the power line PL3 is connected to the PIB terminal 226 to control opening and closing of the charging relay RY1 when the lid 250 is closed, which will be described later.

Referring again to FIG. 1, as in the case of the HV-ECU 300, the PLG-ECU 350 includes a CPU, a memory, and an input/output buffer, which are not shown, receives signals from various sensors, outputs control signals to various devices, and controls the charging operation when external charging operation is performed. Note that the means for performing these control operations is not limited to processing by software but may be processing using a dedicated hardware device (electronic circuitry).

The PLG-ECU 350 further includes a voltage detecting section 354 in addition to the control section 355, the power source node 352, and the pull-up resistor 353.

The voltage detecting section 354 detects a voltage VC of the control line SL3 and outputs the detected value to the control section 355. Based on the voltage VC, the control section 355 checks the connection to the power supply apparatus 600 as described above and determines whether the lid 250 is open or closed as described later. The voltage detecting section 354 may be included in the control section 355.

The PLG-ECU 350 outputs, to a warning device 190, information ALM on the connection state of the charging cable and the state of charging equipment to inform the operator of these states. The PLG-ECU 350 outputs, to the HV-ECU 300, a running inhibition signal INH to prevent the vehicle 100 from running with the charging cable connected.

In a vehicle, that can be supplied with electric power from a plurality of charging ports and, in which the power lines extending from the plurality of charging ports share the charging relay RY1 like the vehicle 100 shown in FIG. 1, while the electricity storage device 110 is charged by the electric power supplied from the external power source 500, for example, a high voltage (200 V, for example) is applied to the DCLP terminal 221 and the DCLN terminal 222 of the inlet 220.

In general, such an inlet is structured so that the charging portion of the terminal cannot be easily touched for safety. However, when the lid is left open with a voltage applied to the terminal as described above, water and foreign objects can enter the terminal portion due to wind and rain, for example, which can cause a leakage of electricity and/or a ground fault. This can lead to the occurrence of failure of the equipment and/or can affect the surrounding.

Thus, in the first embodiment, whether the lid 250 is open or closed is checked with the use of the function of checking the connection to the power supply apparatus 600 described above and when the lid 250 is open and the charging cable 450 is not connected, the vehicle 100 is controlled to inhibit the external charging operation.

Figure 3:
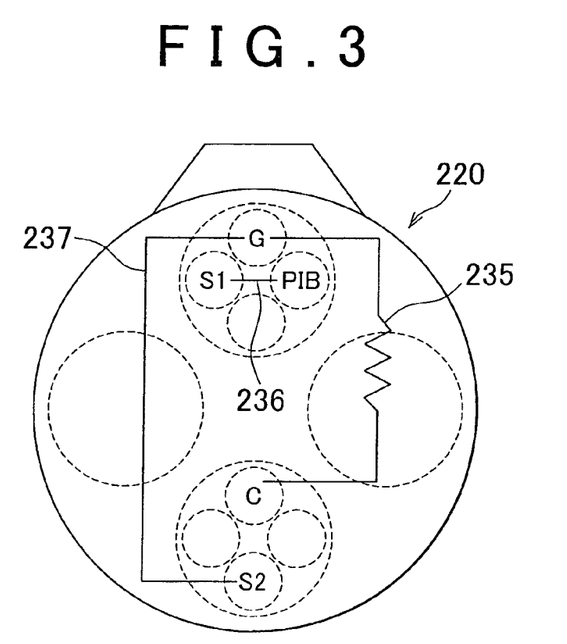
FIG. 3 is a diagram showing a state where a lid of the inlet is closed in the first embodiment.

FIG. 3 is a diagram showing a state where the lid 250 of the inlet 220 is closed in the first embodiment.

Referring to FIGS. 2 and 3, in the inner surface of the lid 250 that faces the inlet 220 side when the lid 250 is closed, the connecting portions 235, 236, and 237 for electrically connecting between predetermined terminals when the lid 250 is closed are disposed.

The connecting portion 235 connects between the G terminal 223 and the C terminal 227 with a resistor interposed between the G terminal 223 and the C terminal 227 when the lid 250 is closed. The connecting portion 236 short-circuits the S1 terminal 224 and the PIB terminal 226. The connecting portion 237 short-circuits the G terminal 223 and the S2 terminal 230.

Figure 4:
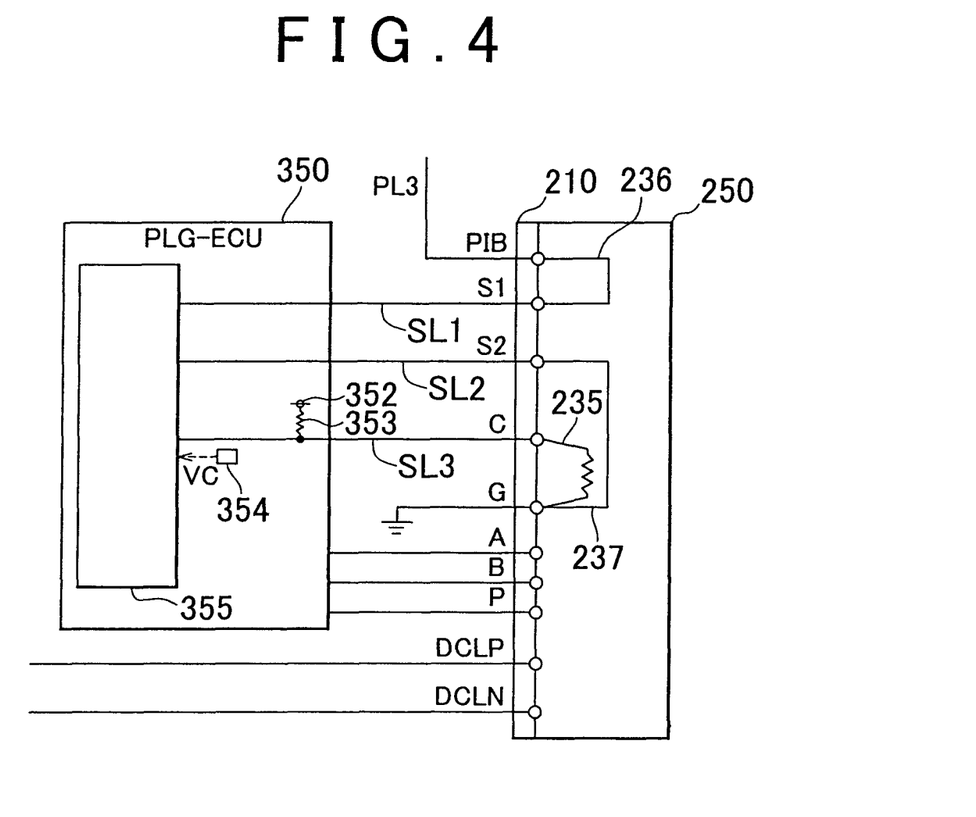
FIG. 4 is a diagram for explaining electrical connection established when the lid of the inlet is closed in the first embodiment.

FIG. 4 is a diagram for explaining the electrical connection established when the lid 250 of the inlet 220 is closed.

Referring to FIG. 4, when the G terminal 223 and the C terminal 227 are connected by the connecting portion 235 with the resistor interposed between the G terminal 223 and the C terminal 227, a voltage that is determined by the power source voltage supplied from the power source node 352, the pull-up resistor 353, and the resistance of the connecting portion 235 occurs in the control line SL3. This voltage can be made lower than the voltage that occurs when the state of connection between the G terminal 223 and the C terminal 227 is open (that is, when the lid is open), and made higher than the voltage that occurs when the G terminal 223 and the C terminal 227 are short-circuited (that is, when the charging cable 450 is connected) by appropriately setting the resistance values of the pull-up resistor 353 and the resistance of the connecting portion 235. Thus, it is possible to determine whether the lid 250 is open or closed and the state of connection to the power supply apparatus 600 based on the voltage of the control line SL3 that is detected by the voltage detecting section 354.

When the S1 terminal 224 and the PM terminal 226 are short-circuited by the connecting portion 236, the power source voltage is supplied from the power line PL3 to the S1 terminal 224. When the G terminal 223 and the S2 terminal 230 are short-circuited by the connecting portion 237, the S2 terminal 230 is connected to the body earth (that is, ground) of the vehicle 100. As described with reference to FIG. 1, The PLG-ECU 350 closes the charging relay RY1 in response to the power source voltage being supplied to the S1 terminal 224 and the S2 terminal 230 being connected to the ground. Thus, when the connecting portion 236 short-circuits the S1 terminal 224 and the PIB terminal 226 and the connecting portion 237 short-circuits the G terminal 223 and the S2 terminal 230 as described above, the charging relay RY1 is closed.

On the other hand, when the lid 250 is open and the power supply apparatus 600 is not connected, the power source voltage is not supplied to the S1 terminal 224 and the S2 terminal is not connected to the ground, so that the PLG-ECU 350 opens the charging relay RY1 and stops the electric power converting operation to be performed by the charging device 200 because the external charging operation cannot be performed. Thus, when the lid 250 is open and the power supply apparatus 600 is not connected, a high DC voltage is prevented from being applied to the DCLP terminal 221 and the DCLN terminal 222 of the inlet 220 even when the electric power from the external power source 500 is supplied to the inlet 210.

Figure 5:
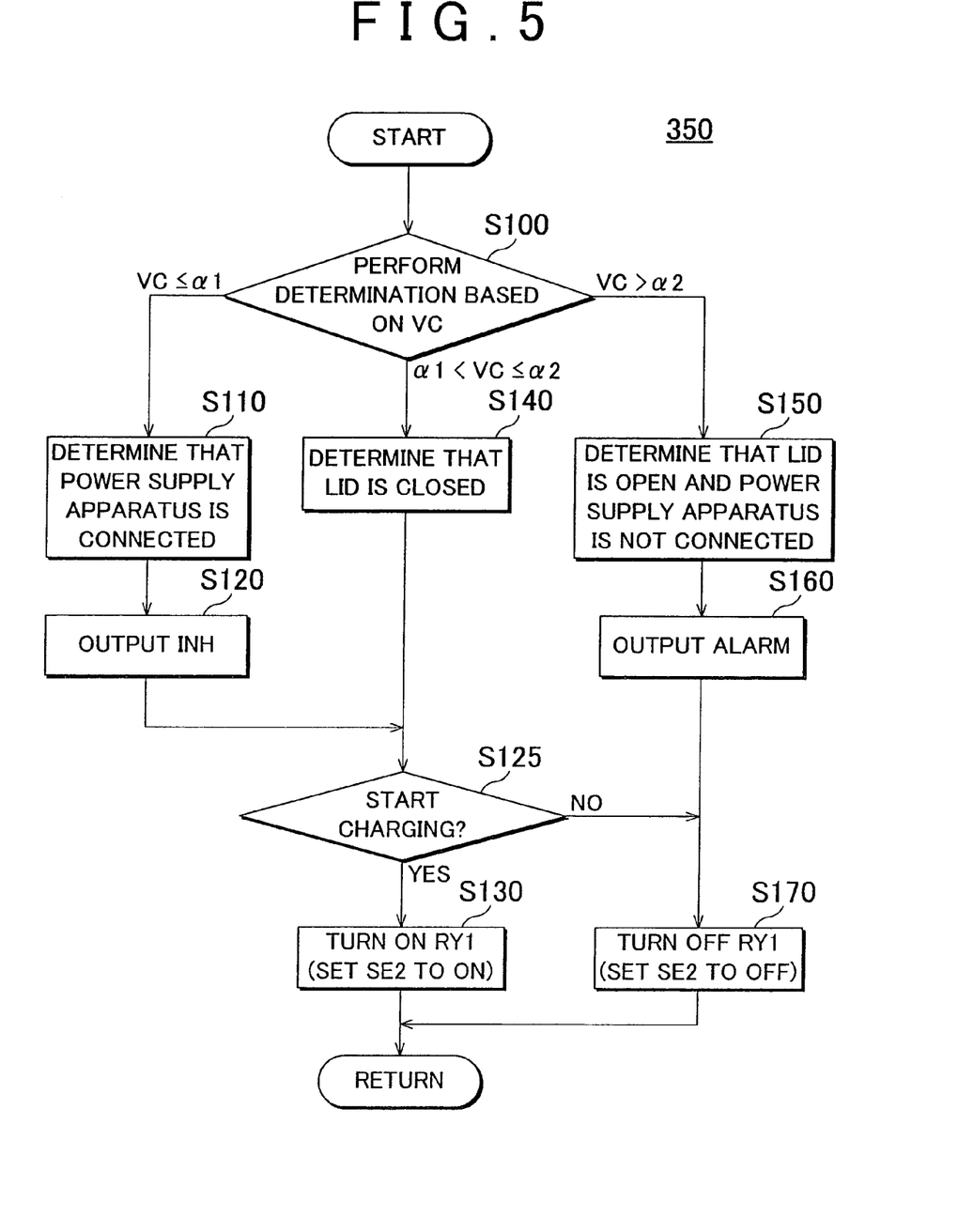
FIG. 5 is a flow chart for explaining control processing for determining whether charging may be performed, which processing is executed by a PLG-ECU in the first embodiment.

FIG. 5 is a flow chart for explaining control processing for determining whether charging may be performed, which processing is executed by the PLG-ECU 350. The steps in the flow chart shown in FIG. 5 and FIG. 11 to be described later are implemented by the program stored in the PLG-ECU 350 in advance that is called by the main routine and executed in a predetermined cycle. Alternatively, the processing of part of steps can be implemented by constructing a dedicated hardware device (electronic circuit).

Referring to FIGS. 1 and 5, the PLG-ECU 350 determines whether the lid 250 is open or closed and the state of connection to the power supply apparatus 600 by comparing the voltage VC of the control line SL3 detected by the voltage detecting section 354 with threshold values α1 and α2 in step 100 (hereinafter "step" is abbreviated as "S"). The threshold value α1 herein is a threshold value for determining whether the vehicle 100 is connected to the power supply apparatus 600 and is set to a value close to zero. The threshold value α2 is set to a value that is slightly higher than the voltage of the control line SL3 that is determined by the pull-up resistor 353 and the resistance of the connecting portion 235 when the lid 250 is closed. Specifically, in step S100, which of the following states is occurring is determined: 1) a state where the vehicle 100 is connected to the power supply apparatus 600 via the charging cable 450; 2) a state where the lid 250 is closed; and 3) a state where the lid 250 is open and the vehicle 100 is not connected to the power supply apparatus 600.

When the voltage VC is equal to or lower than the threshold value al (VC≤α1 in S100), the process proceeds to S110 and the PLG-ECU 350 determines that a state where the vehicle 100 is connected to the power supply apparatus 600 via the charging cable 450 is occurring.

In S120, the PLG-ECU 350 outputs the running inhibition signal INH to the HV-ECU 300 in order to prevent the equipment, such as the charging cable 450 and the inlet 220, from being broken down, damaged, etc. by the movement of the vehicle 100 with the charging cable 450 connected. Although not shown, the HV-ECU 300 inhibits running of the vehicle 100 by, for example, inhibiting the closure of the system main relay SMR and/or outputting a control signal to stop the converter or the inverter (none of these shown) in the PCU 120.

Next, in S125, the PLG-ECU 350 determines whether to perform charging the electricity storage device 110.

When the electricity storage device 110 is charged (YES in S125), the PLG-ECU 350 closes the charging relay RY1 by setting the control signal SE2 to ON and outputting the control signal SE2 in S130.

On the other hand, when the electricity storage device 110 is in a fully-charged state or charging is not immediately performed because, for example, the time to start charging is not reached (NO in S125), the process proceeds to S170 and the PLG-ECU 350 opens the charging relay RY1 by setting the control signal SE2 to OFF and outputting the control signal SE2.

When the voltage VC is higher than the threshold value $\alpha 1$ and equal to or lower than the threshold value $\alpha 2$ ($\alpha 1 < VC \leq \alpha 2$ in S100), the process proceeds to S140 and the PLG-ECU 350 determines that a state where the lid 250 is closed is occurring.

The process then proceeds to S125 and, as described above, the PLG-ECU 350 controls the charging relay RY1 according to the result of determination as to whether charging may be performed (S130 or S170).

When the voltage VC is higher than the threshold value $\alpha 2$ ($VC > \alpha 2$ in S100), the PLG-ECU 350 determines that a state where the lid 250 is open and the power supply apparatus 600 is not connected is occurring, in S150. Such a state also occurs when the control line SL3 is broken. Thus, in such a case, the PLG-ECU 350 determines that the external charging operation should not be allowed.

Next, in S160, the PLG-ECU 350 outputs an alarm by the warning device 190 to inform the operator that the state where the lid 250 is open and the power supply apparatus 600 is not connected is occurring.

The PLG-ECU 350 then opens the charging relay RY1 by setting the control signal SE2 to OFF and outputting the control signal SE2 in S170. Even when the lid 250 is open and the power supply apparatus 600 is not connected, the running inhibition signal INH is not output to the HV-ECU 300 when the charging cable 400 used for connection to the external power source 500 is not connected to the inlet 210 because, in this case, there is no need to inhibit running of the vehicle 100 immediately.

By performing control according to the above described process, it is possible to determine whether the lid 250 is open or closed and the state of connection to the power supply apparatus 600 and it is also possible to control opening and closing of the charging relay RY1 according to the result of determination. In this way, it is possible to prevent a high DC voltage from being applied to the terminal portion of the inlet 220 with the lid 250 opened, so that it is possible to suppress the failure of the equipment and the influence on the surrounding due to a leakage of electricity and/or a ground fault.

A table of the magnitude of the voltage VC and the state of the vehicle 100 as described above is shown in FIG. 6.

Figure 6:
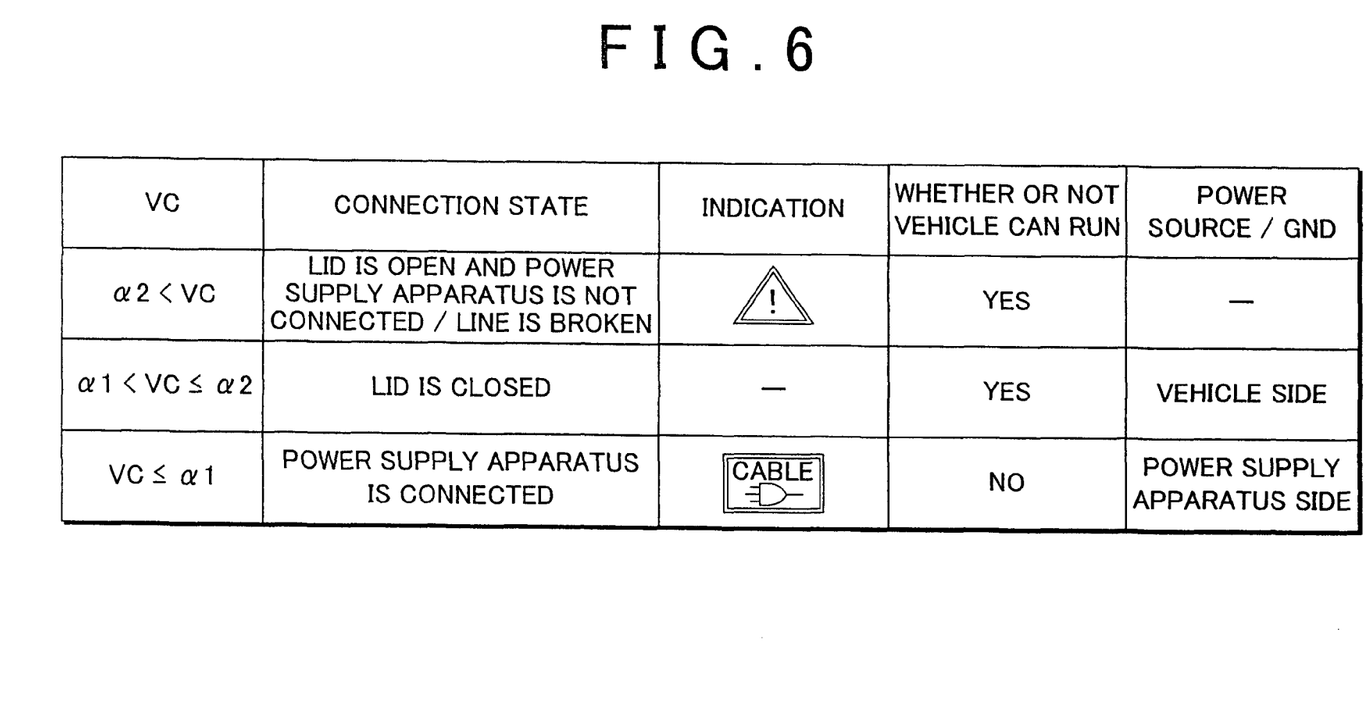
FIG. 6 is a diagram for explaining the magnitude of a terminal voltage and the state of the vehicle.

Referring to FIG. 6, when the voltage VC is higher than the threshold value $\alpha 2$ ($\alpha 2 < VC$), the vehicle 100 is in a state where the lid 250 is open and the vehicle 100 is not connected to the power supply apparatus 600, or in a state where the control line SL3 is broken. In addition, an indication to warn the operator is provided on the warning device 190. In this case, the running inhibition signal INH is not output and the vehicle 100 can run.

When the voltage VC is higher than the threshold value $\alpha 1$ and equal to or lower than the threshold value $\alpha 2$ ($\alpha 1 < VC \leq \alpha 2$), the vehicle is in a state where the lid 250 is closed. In this case, the vehicle 100 can run. When the S1 terminal 224 and the S2 terminal 230 of the inlet 220 are connected to the power source voltage and the body earth on the vehicle 100 side by the connecting portions 236 and 237, respectively, of the lid 250.

When the voltage VC is equal to or lower than the threshold value $\alpha 1$ ($VC \leq \alpha 1$), the vehicle 100 is in a state where the vehicle 100 is connected to the power supply apparatus 600 via the charging cable 450. In addition, an indication meaning that the charging cable 450 is connected is provided on the warning device 190. In this case, the running inhibition signal INH is output and the vehicle 100 is prevented from running. In this case, the S1 terminal 224 and the S2 terminal 230 of the inlet 220 are connected to the power source voltage and the ground, respectively, on the power supply apparatus 600 side.

Second Embodiment

In the description of the first embodiment, a configuration is described, in which the S1 terminal 224 and the S2 terminal 230 of the inlet 220 are connected to the power source voltage and the body earth by the connecting portions 236 and 237 of the inlet 220, respectively, when the lid 250 is closed.

In such a configuration, when the lid 250 is suddenly opened while the lid 250 is closed and a charging operation is performed with the use of the electric power supplied from the external power source 500, there is a possibility that the contact portions of the charging relay RY1 are opened while the charging electric current is flowing through the charging relay RY1. This can lead to the melting and sticking of the contact portions of the charging relay RY1.

In the description of a second embodiment, a configuration is described, in which the vehicle includes a plurality of switches that connect the control lines SL1 and SL2 to the power source voltage and the body earth, respectively, the control lines SL1 and SL2 connecting between the PLG-ECU 350 and the S1 terminal 224 and the S2 terminal 230, respectively, and in which the PLG-ECU 350 controls the plurality of switches. With this configuration, even when the lid 250 is opened while the charging process is performed with the use of the electric power supplied from the external power source 500, it is possible to open the charging relay RY1 after the PLG-ECU 350 reduces the DC electric current output from the charging device 200. Thus, it is possible to prevent the contact portions of the charging relay RY1 from melting and sticking.

Figure 7:
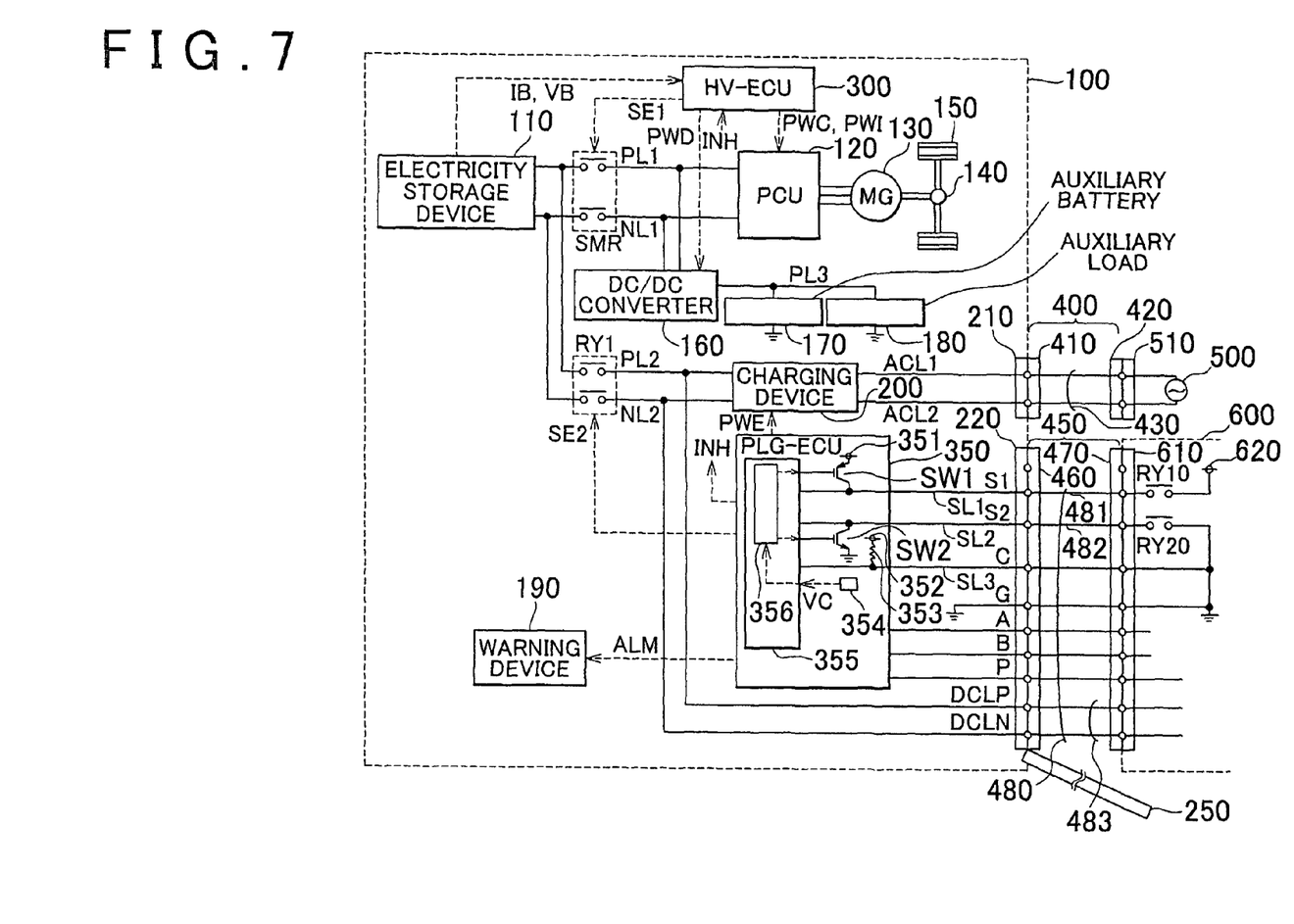
FIG. 7 is an overall block diagram of a vehicle according to a second embodiment.

FIG. 7 is an overall block diagram of the vehicle 100 according to the second embodiment. FIG. 7 shows a configuration, in which the PLG-ECU 350 shown in FIG. 1 of the first embodiment further includes switches SW1 and SW2, and a switching control section 356. Description of the components shown in FIG. 7 corresponding to those shown in FIG. 1 is not repeated.

Referring to FIG. 7, the PLG-ECU 350 further includes a power source node 351 and the switches SW1 and SW2. In addition, the control section 355 in the PLG-ECU 350 includes the switch control section 356.

The switch SW1 is driven by the switch control section 356 and switches between supply and cutoff of power source voltage to be supplied from the power source node 351 to the control line SL1. Note that as the power source voltage from the power source node 351, the power source voltage from the power source node 352 or the power source voltage from the power line PL3 may be used.

The switch SW2 is also driven by the switch control section 356 and switches between connection and disconnection between the control line SL2 and the body earth of the vehicle 100.

Although the switches SW1 and SW2 are disposed in the PLG-ECU 350, the switches SW1 and SW2 may be disposed externally to the PLG-ECU 350.

The switch control section 356 receives the detected value of the voltage VC of the control line SL3 from the voltage detecting section 354. The switch control section 356 detects, based on the voltage VC, that the lid 250 is closed and, when the electricity storage device 110 is charged with the use of the electric power from the external power source 500, the switch control section 356 performs control so as to turn on the switches SW1 and SW2. In this way, connection is established between the power source node 351 and the control line SL1 and between the control line SL2 and the body earth.

When the switch control section 356 detects, based on the voltage VC, that the lid 250 is closed, the switch control section 356 outputs the control signal PWE so as to stop the electric power converting operation of the charging device 200 to stop the output of the DC electric current. After a predetermined period of time has passed since the control signal PWE that stops the electric power converting operation of the charging device 200 was output, the switch control section 356 performs control so as to turn off the switches SW1 and SW2 in response to detecting that the DC electric current output from the charging device 200 measured by the electric current sensor (not shown) falls to or below a predetermined threshold value. In this way, the connection between the power source node 351 and the control line SL1 and the connection between the control line SL2 and the body earth are cut off. As a result, it becomes possible to open the charging relay RY1 after reducing the charging electric current.

Figure 8:
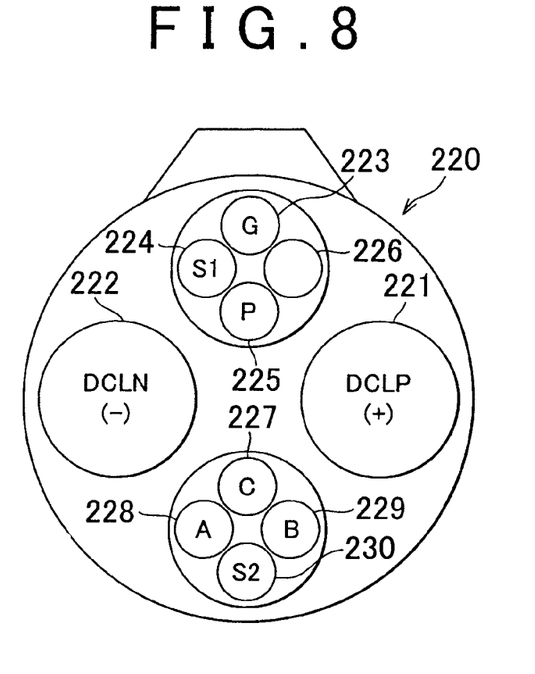
FIG. 8 is a diagram for explaining an arrangement of terminals of an inlet in the second embodiment.

FIG. 8 is a diagram for explaining the arrangement of the terminals of the inlet 220 in the second embodiment. In FIG. 8, a difference exists in that the PIB terminal 226 shown in FIG. 2 of the first embodiment is a vacant terminal.

Figure 9:
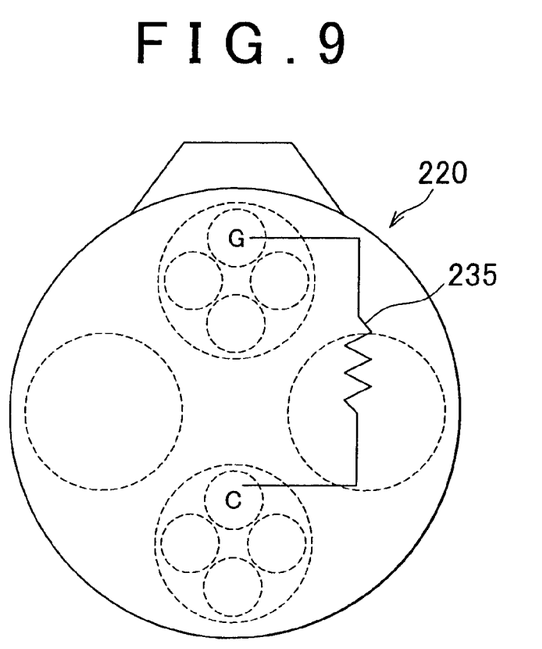
FIG. 9 is a diagram showing a state where a lid of the inlet is closed in the second embodiment.
Figure 10:
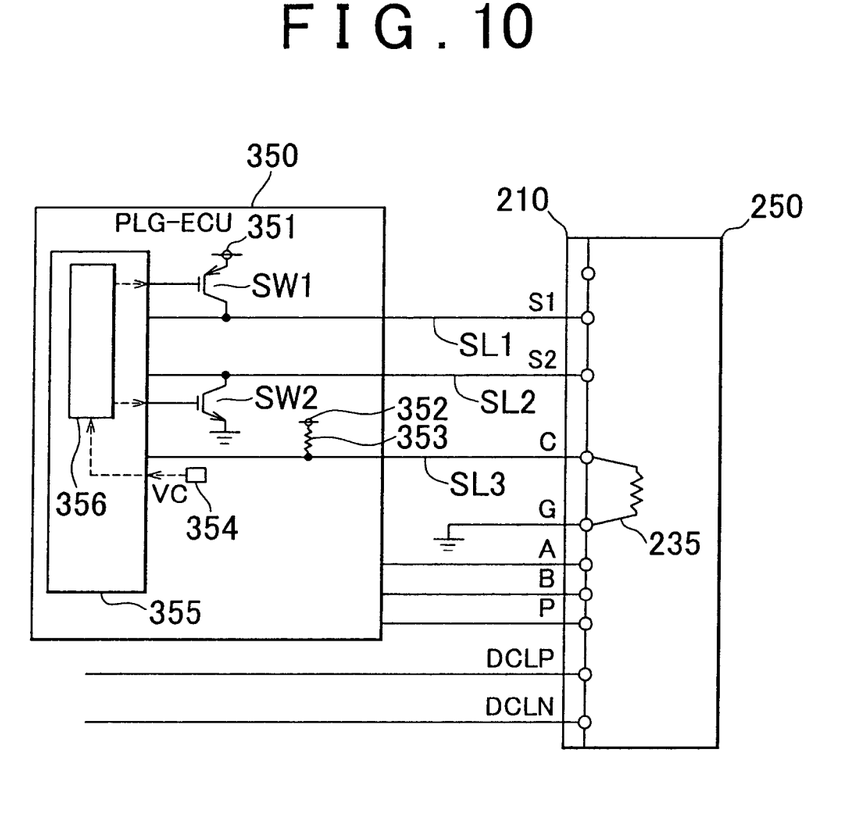
FIG. 10 is a diagram for explaining electrical connection established when the lid of the inlet is closed in the second embodiment.

FIG. 9 is a diagram showing a state where the lid 250 of the inlet 220 is closed in the second embodiment. In the second embodiment, the control lines SL1 and SL2 are connected to the power source voltage and the body earth by the switches SW1 and SW2 and therefore, the connecting portions 236 and 237 shown in FIG. 3 of the first embodiment are unnecessary. Thus, the connecting portion 235 alone is disposed to detect whether the lid 250 is open or closed and as shown in FIG. 10, when the lid 250 is closed, the G terminal 223 and the C terminal 227 of the inlet 220 are connected to each other via the connecting portion 235.

Figure 11:
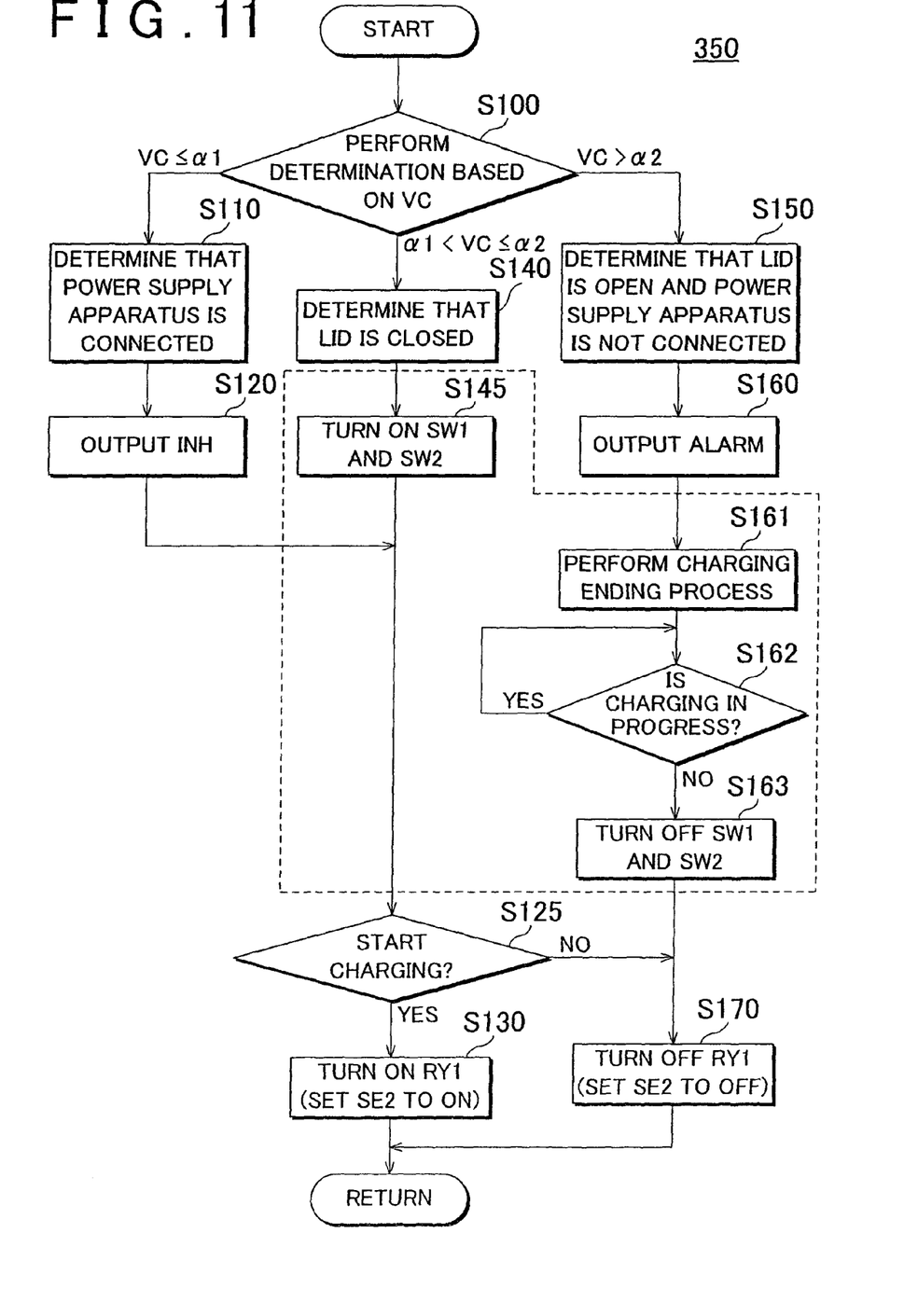
FIG. 11 is a flow chart for explaining control processing for determining whether charging may be performed, which processing is executed by a PLG-ECU in the second embodiment.

FIG. 11 is a flow chart for explaining control processing for determining whether charging may be performed, which processing is executed by the PLG-ECU 350. The flow chart shown in FIG. 11 is obtained by adding the steps S145, and S161 to S163 to the flow chart shown in FIG. 5 of the first embodiment. Description of the steps shown in FIG. 11 corresponding to those shown in FIG. 5 is not repeated.

Referring to FIGS. 7 and 11, when the voltage VC is greater than the threshold value $\alpha 1$ and equal to or less than the threshold value $\alpha 2$ ($\alpha 1 < VC \leq \alpha 2$), that is, it is determined that a state where the lid 250 is closed is occurring (S140) in S100, the PLG-ECU 350 turns on the switches SW1 and SW2 to connect the control lines SL1 and SL2 to the power source voltage and the body earth, respectively, in S145. In this way, the condition for closing the charging relay RY1 is satisfied.

Then, the process proceeds to S125 and as in the case of the first embodiment, the PLG-ECU 350 controls the charging relay RY1 according to the result of determination as to whether charging may be performed (S130 or S170).

When the voltage VC is higher than the threshold value $\alpha 2$ ($VC > \alpha 2$), that is, it is determined that a state where the lid 250 is open and the power supply apparatus 600 is not connected is occurring (S150) in S100, the PLG-ECU 350 outputs an alarm in S160 and starts a process for ending charging of the charging device 200 in S161.

Then, the PLG-ECU 350 determines whether charging is in progress in S162. The determination, made in S162, as to whether charging is in progress is performed based on whether a predetermined period of time has passed since the start of the charging ending process in S161, or on whether the DC electric current output from the charging device 200 measured by the electric current sensor (not shown) falls to or below a predetermined value, for example.

When charging is in progress (YES in S162), the process returns to S162 and the PLG-ECU 350 waits for the end of charging.

On the other hand, when the charging process is ended (NO in S162), the process proceeds to S163 and the PLG-ECU 350 turns off the switches SW1 and SW2. Then, the process proceeds to S170 and the charging relay RY1 is opened.

By performing control according to such a process, even when the lid 250 is opened during the external charging operation, it is possible to open the charging relay RY1 after reducing the charging electric current. Thus, it is possible to prevent the contact portions of the charging relay RY1 from melting and sticking.

The "inlet 220" and the "inlet 210" of the above embodiments are examples of the "first inlet" and the "second inlet" of the invention, respectively. The "C terminal 227", the "G terminal 223", the "S1 terminal 224", the "S2 terminal 230", and the "PIB terminal 226" are examples of the "first terminal" to the "fifth terminal" of the invention, respectively. The "PLG-ECU 350" of the embodiments is an example of the "controller" of the invention. The "control line SL1" and the "control line SL2" of the embodiments are examples of the "first line" and the "second line" of the invention. The "switch SW1" and the "switch SW2" of the embodiments are examples of the "first switch" and the "second switch" of the invention. The "power source node 352" of the embodiments is an example of the "voltage connection portion" of the invention.

The embodiments disclosed herein are merely examples and should not be considered as restrictive. The scope of the invention is not determined by the above description but by the claims and it is intended to include all the modifications within the scope of the claims and the equivalent thereof.

What is claimed is:

1. A vehicle that can be charged by receiving electric power from an external power supply apparatus via a charging cable, comprising:

a first inlet for connection with a connector of the charging cable, the first inlet including a power terminal for receiving electric power from the power supply apparatus, and a first terminal and a second terminal that are separate from the power terminal, the first terminal comprises a terminal that receives a signal for detecting connection of the vehicle to the power supply apparatus via the charging cable, and the second terminal is connected to ground;

a protection portion that protects the first inlet and can be opened and closed, the protection portion includes a connecting portion configured to electrically connect between the first terminal and the second terminal when the protection portion is closed;

an electricity storage device capable of being charged by the electric power supplied from the power supply apparatus, the electricity storage device being electrically connected to the first inlet; and a controller configured to determine whether the protection portion is open or closed, based on a state of connection between the first terminal and the second terminal.

2. The vehicle according to claim 1, wherein, when the protection portion is closed, the protection portion connects between the first terminal and the second terminal via a connecting portion resistor included in the connecting portion.

3. The vehicle according to claim 2, wherein:
the controller includes a voltage connection portion that supplies a voltage higher than a voltage of the ground to the first terminal via a pull-up resistor, and a voltage detecting section that detects a voltage of the first terminal;
when the detected voltage detected by the voltage detecting section is lower than a first voltage, the controller determines that the vehicle is connected to the power supply apparatus;
when the detected voltage is higher than the first voltage and is lower than a second voltage that is higher than the first voltage, the controller determines that the protection portion is closed; and,
when the detected voltage is higher than the second voltage, the controller determines that the protection portion is open and the vehicle is not connected to the power supply apparatus.

4. The vehicle according to claim 3, wherein the second voltage is lower than the voltage of the voltage connection portion and higher than a voltage that is determined by the voltage of the voltage connection portion, a resistance value of the connecting portion resistor, and a resistance value of the pull-up resistor when the voltage connection portion is grounded via the connecting portion resistor and the pull-up resistor.

5. The vehicle according to claim 1, further comprising a switching device that is placed in a power line connecting between the power terminal and the electricity storage device and is configured to be brought into conduction when the switching device is closed, brought out of conduction when the switching device is opened, so that the switching device is capable of switching between supply and cutoff of electric power supplied from the power supply apparatus,
wherein the controller closes the switching device when the electricity storage device is charged.

6. The vehicle according to claim 5, wherein:
the charging cable includes a power cable that transmits electric power for charging the electricity storage device, a power source line that transmits a first power source voltage for control from the power supply apparatus, and a ground line that is grounded in the power supply apparatus;
the first inlet further includes a third terminal and a fourth terminal, to which the power source line and the ground line are connected, respectively, when the charging cable is connected to the first inlet, and a fifth terminal that is connected to a second power source voltage for control in the vehicle;
the switching device is closed when the third terminal is connected to the power source voltage and the fourth terminal is grounded; and
the protection portion is configured to electrically connect between the third terminal and the fifth terminal and electrically connect between the second terminal and the fourth terminal when the protection portion is closed.

7. The vehicle according to claim 5, wherein:
the charging cable includes a power cable that transmits electric power for charging the electricity storage device, a power source line that transmits a first power source voltage for control from the power supply apparatus, and a ground line that is grounded in the power supply apparatus;
the first inlet further includes a third terminal and a fourth terminal, to which the power source line and the ground line are connected, respectively, when the charging cable is connected to the first inlet;
the switching device is closed when the third terminal is connected to the power source voltage and the fourth terminal is grounded;
the vehicle further comprises a first line and a second line, the first line connecting between the third terminal and the controller, the second line connecting between the fourth terminal and the controller;
the controller includes a power source node, a first switch that electrically connects between the first line and the power source node when the first switch is activated, and a second switch that electrically connects between the second line and the ground when the second switch is activated; and
the controller activates the first switch and the second switch when it is detected that the protection portion is closed.

8. The vehicle according to claim 7, wherein,
when it is detected that the protection portion is opened, the controller deactivates at least one of the first switch and the second switch after an electric current flowing through the switching device falls below a threshold value.

9. The vehicle according to claim 5, wherein:
the power supply apparatus supplies direct-current (DC) power to the vehicle;
the vehicle further comprises a second inlet for receiving alternating-current (AC) power from an external power source, and a charging device, connected between the second inlet and the switching device, for converting the AC power, supplied from the external power source, to DC power to charge the electricity storage device; and
the electricity storage device is charged by one of the DC power supplied from the power supply apparatus and the DC power supplied from the charging device.

10. The vehicle according to claim 9, wherein the controller closes the switching device when the vehicle is connected to the power supply apparatus and the electricity storage device is charged by the electric power supplied from the power supply apparatus or when the protection portion is closed and the electricity storage device is charged by the electric power supplied from the external power source.

11. A vehicle that can be charged by receiving electric power from an external power supply apparatus via a charging cable, comprising:
a first inlet for connection with a connector of the charging cable, the first inlet including a power terminal for receiving electric power from the power supply apparatus, and a first terminal and a second terminal that are separate from the power terminal, the first terminal comprises a terminal that receives a signal for detecting connection of the vehicle to the power supply apparatus via the charging cable, and the second terminal is connected to ground;
a protection portion that protects the first inlet and can be opened and closed, the protection portion includes a connecting portion configured to electrically connect between the first terminal and the second terminal when the protection portion is closed;

an electricity storage device capable of being charged by the electric power supplied from the power supply apparatus, the electricity storage device being electrically connected to the first inlet; and a controller configured to determine whether the protection portion is open or closed, based on a state of connection between the first terminal and the second terminal, wherein, when the protection portion is closed, the protection portion connects between the first terminal and the second terminal via a connecting portion resistor included in the connecting portion;

wherein the controller includes a voltage connection portion that supplies a voltage higher than a voltage of the ground to the first terminal via a pull-up resistor, and a voltage detecting section that detects a voltage of the first terminal;

wherein, when the detected voltage detected by the voltage detecting section is lower than a first voltage, the controller determines that the vehicle is connected to the power supply apparatus;

wherein when the detected voltage is higher than the first voltage and is lower than a second voltage that is higher than the first voltage, the controller determines that the protection portion is closed; and wherein when the detected voltage is higher than the second voltage, the controller determines that the protection portion is open and the vehicle is not connected to the power supply apparatus.

12. A vehicle that can be charged by receiving electric power from an external power supply apparatus via a charging cable, comprising:

a first inlet for connection with a connector of the charging cable, the first inlet including a power terminal for receiving electric power from the power supply apparatus, and a first terminal and a second terminal that are separate from the power terminal;

a protection portion that protects the first inlet and can be opened and closed;

an electricity storage device capable of being charged by the electric power supplied from the power supply apparatus, the electricity storage device being electrically connected to the first inlet;

a controller configured to determine whether the protection portion is open or closed, based on a state of connection between the first terminal and the second terminal; and a switching device that is placed in a power line connecting between the power terminal and the electricity storage device and is configured to be brought into conduction when the switching device is closed, brought out of conduction when the switching device is opened, so that the switching device is capable of switching between supply and cutoff of electric power supplied from the power supply apparatus, wherein the controller closes the switching device when the electricity storage device is charged, wherein the charging cable includes a power cable that transmits electric power for charging the electricity storage device, a power source line that transmits a first power source voltage for control from the power supply apparatus, and a ground line that is grounded in the power supply apparatus;

wherein the first inlet further includes a third terminal and a fourth terminal, to which the power source line and the ground line are connected, respectively, when the charging cable is connected to the first inlet, and a fifth terminal that is connected to a second power source voltage for control in the vehicle;

wherein the switching device is closed when the third terminal is connected to the power source voltage and the fourth terminal is grounded;

wherein the protection portion is configured to electrically connect between the third terminal and the fifth terminal and electrically connect between the second terminal and the fourth terminal when the protection portion is closed, wherein the charging cable includes a power cable that transmits electric power for charging the electricity storage device, a power source line that transmits a first power source voltage for control from the power supply apparatus, and a ground line that is grounded in the power supply apparatus;

wherein the first inlet further includes a third terminal and a fourth terminal, to which the power source line and the ground line are connected, respectively, when the charging cable is connected to the first inlet;

wherein the switching device is closed when the third terminal is connected to the power source voltage and the fourth terminal is grounded;

wherein the vehicle further comprises a first line and a second line, the first line connecting between the third terminal and the controller, the second line connecting between the fourth terminal and the controller;

wherein the controller includes a power source node, a first switch that electrically connects between the first line and the power source node when the first switch is activated, and a second switch that electrically connects between the second line and the ground when the second switch is activated; and wherein the controller activates the first switch and the second switch when it is detected that the protection portion is closed.

* * * * *